US008522168B2

(12) United States Patent
Williams

(10) Patent No.: US 8,522,168 B2
(45) Date of Patent: Aug. 27, 2013

(54) SYSTEM AND METHOD FOR NAVIGATING POSTS IN A DISCUSSION

(75) Inventor: Dominic Williams, London (GB)

(73) Assignee: Centre Technologies Ltd., London (GB)

( * ) Notice: Subject to any disclaimer, the term of this patent is extended or adjusted under 35 U.S.C. 154(b) by 514 days.

(21) Appl. No.: 12/397,529

(22) Filed: Mar. 4, 2009

(65) Prior Publication Data

US 2010/0229127 A1    Sep. 9, 2010

(51) Int. Cl.
G06F 17/00    (2006.01)
G06F 3/00    (2006.01)
G06F 3/048    (2006.01)
G06F 15/16    (2006.01)

(52) U.S. Cl.
USPC ........... 715/854; 715/234; 715/713; 715/733; 715/751; 715/752; 715/804; 715/805; 709/204; 709/206; 709/219

(58) Field of Classification Search
USPC ................. 715/854, 234, 713, 733, 751, 752, 715/770, 804, 805; 707/204, 206, 219
See application file for complete search history.

(56) References Cited

U.S. PATENT DOCUMENTS

| 8,122,086 B1* | 2/2012 | King et al. | 709/206 |
| 2005/0262203 A1* | 11/2005 | Buchheit et al. | 709/206 |
| 2008/0082607 A1* | 4/2008 | Sastry et al. | 709/204 |

OTHER PUBLICATIONS

Mundu IM iPhone Edition http://blog.tmcnet.com/blog/tom-keating/mobile-phones/mundu-im-iphone-edition.asp Aug. 6, 2007.*

* cited by examiner

*Primary Examiner* — Alvin Tan
*Assistant Examiner* — Rinna Yi
(74) *Attorney, Agent, or Firm* — Deepak Malhotra; Malhotra Law Firm, PLLC

(57) ABSTRACT

A method for navigating posts in a discussion including parent posts and child posts, a child post being in reply to a parent post, wherein a further reply can be made to a child post and wherein multiple child posts can be made in reply to respective parent or child posts, the method including receiving posts and storing posts; arranging posts in a discussion linearly one below another; providing a parent navigator which, when actuated, causes a copy of a parent post to be inserted adjacent its child post. Some embodiment comprise providing a child navigator which, when actuated, causes a copy of a parent post to be inserted adjacent its child post. Various other methods and apparatus are also provided.

29 Claims, 16 Drawing Sheets (Preceding messages...)

Bob @ 12.30pm 12/12/1996 [Reply] — 12

I don't know about you people, but I'm beginning to see this Web forum thing is the future. I've been on these forums for a month now and I can't see myself going back to Usenet groups - ever!

Joe @ 3.03pm 12/12/1996 [Reply] — 14

People like you, I don't know Bob! Whatever glistens eh? This Web forum has some nice features and I admit this is only my first day but it ain't a patch on Usenet. Forget graphical layout. Text rules.

Bob @ 8.45pm 14/12/1996 [Reply] — 16

It should be about ease of use and experience Joe. Usenet is way too arcane. It was built for academics.

Sal @ 9.21pm 15/12/1996 [Reply] — 18

Joe I can only speak for myself. I tried Usenet and couldn't make head or tail of it. But I'm on this Web forum day and night

Ann @ 1.38pm 16/12/1996 [Reply] — 20

I just love this Web forum stuff. Power to the Web!

(Following messages...)

FIG. 1
PRIOR ART

Bob @ 8.45pm 14/12/1996 [Reply] 38

Joe @ 3.03pm 12/12/1996

Bob @ 12.30pm 12/12/1996

I don't know about you people, but I'm beginning to see this Web forum thing is the future. I've been on these forums for a month now and I can't see myself going back to Usenet groups - ever!

People like you, I don't know Bob! Whatever glistens eh? This Web forum has some nice features and I admit this is only my first day but it ain't a patch on Usenet. Forget graphical layout. Text rules.

It should be about ease of use and experience Joe. Usenet is way too arcane. It was built for academics. — 44

54, 50

---

Sal @ 9.21pm 15/12/1996 [Reply] 40

Joe @ 3.03pm 12/12/1996

Bob @ 12.30pm 12/12/1996

I don't know about you people, but I'm beginning to see this Web forum thing is the future. I've been on these forums for a month now and I can't see myself going back to Usenet groups - ever!

People like you, I don't know Bob! Whatever glistens eh? This Web forum has some nice features and I admit this is only my first day but it ain't a patch on Usenet. Forget graphical layout. Text rules.

Joe I can only speak for myself. I tried Usenet and couldn't make head or tail of it. But I'm on this Web forum day and night — 46

56, 52

---

Ann @ 1.38pm 16/12/1996 [Reply] 34

I just love this Web forum stuff. Power to the Web!

(Following messages...)

FIG. 2B (Preceding messages in linear listing...)

Bob @ 12.30pm 12/12/2008 — 901

Re: Sam @ 11.09am 12/12/2008

Topic: Here's a topic that's been waiting - how are you finding this new Web forum system?

I don't know about you people, but I'm beginning to see this Web forum thing is the future. I've been on these forums for a month now and I can't see myself going back to Usenet groups - ever!

1 reply   + reply

Joe @ 3.03pm 12/12/2008 — 902

People like you, I don't know Bob! Whatever glistens eh? This Web forum has some nice features and I admit this is only my first day but it ain't a patch on Usenet. Forget graphical layout. Text rules.

show reply«1:2»   + reply — 906

Bob @ 8.45pm 14/12/2008 — 903

It should be about ease of use and experience Joe. Usenet is way too arcane. It was built for academics.

no replies   + reply

Sal @ 9.21pm 15/12/2008 — 904

Re: Joe @ 3.03pm 12/12/2008 — 907

People like you, I don't know Bob! Whatever glistens eh? This Web forum has some nice features and I admit this is only my first day...

Joe I can only speak for myself. I tried Usenet and couldn't make head or tail of it. But I'm on this Web forum day and night no replies   + reply

Ann @ 1.38pm 16/12/2008 — 905

Re: Sam @ 11.09am 12/12/2008

Topic: Here's a topic that's been waiting - how are you finding this new Web forum system?

I just love this Web forum stuff. Power to the Web!

no replies   + reply (Following messages in linear listing...)

FIG. 9

(Preceding messages in linear listing...)

```
Sam @ 11.09am 12/12/2008
-----------------------------------------------------------
Topic: Here's a topic that's been waiting - how are you finding this
new Web forum system?
                                        show reply«5:23»   + reply
```
— 1000

1001

Bob @ 12.30pm 12/12/2008
-----------------------------------------------------------
I don't know about you people, but I'm beginning to see this Web forum thing is the future. I've been on these forums for a month now and I can't see myself going back to Usenet groups - ever!
                                                  1 reply   + reply

1002

Joe @ 3.03pm 12/12/2008
-----------------------------------------------------------
People like you, I don't know Bob! Whatever glistens eh? This Web forum has some nice features and I admit this is only my first day but it ain't a patch on Usenet. Forget graphical layout. Text rules.
                                        show reply«1:2»   + reply

1006

1003

Bob @ 8.45pm 14/12/2008
-----------------------------------------------------------
It should be about ease of use and experience Joe. Usenet is way too arcane. It was built for academics.
                                                 no replies   + reply

1004

Sal @ 9.21pm 15/12/2008
-----------------------------------------------------------
Re: Joe @ 3.03pm 12/12/2008
```
People like you, I don't know Bob! Whatever glistens eh? This Web
forum has some nice features and I admit this is only my first day...
```

1007

Joe I can only speak for myself. I tried Usenet and couldn't make head or tail of it. But I'm on this Web forum day and night
                                                 no replies   + reply

1005

Ann @ 1.38pm 16/12/2008
-----------------------------------------------------------
Re: Sam @ 11.09am 12/12/2008
```
Topic: Here's a topic that's been waiting - how are you finding this
new Web forum system?
```
I just love this Web forum stuff. Power to the Web!
                                                 no replies   + reply (Following messages in linear listing...)   FIG. 10

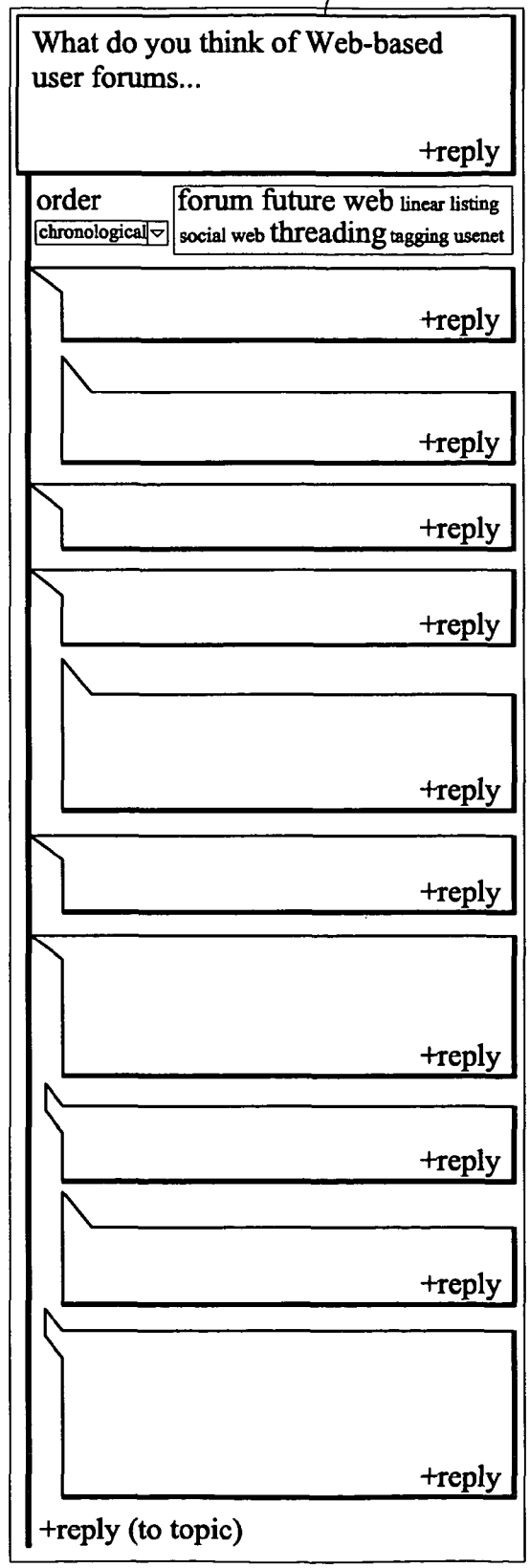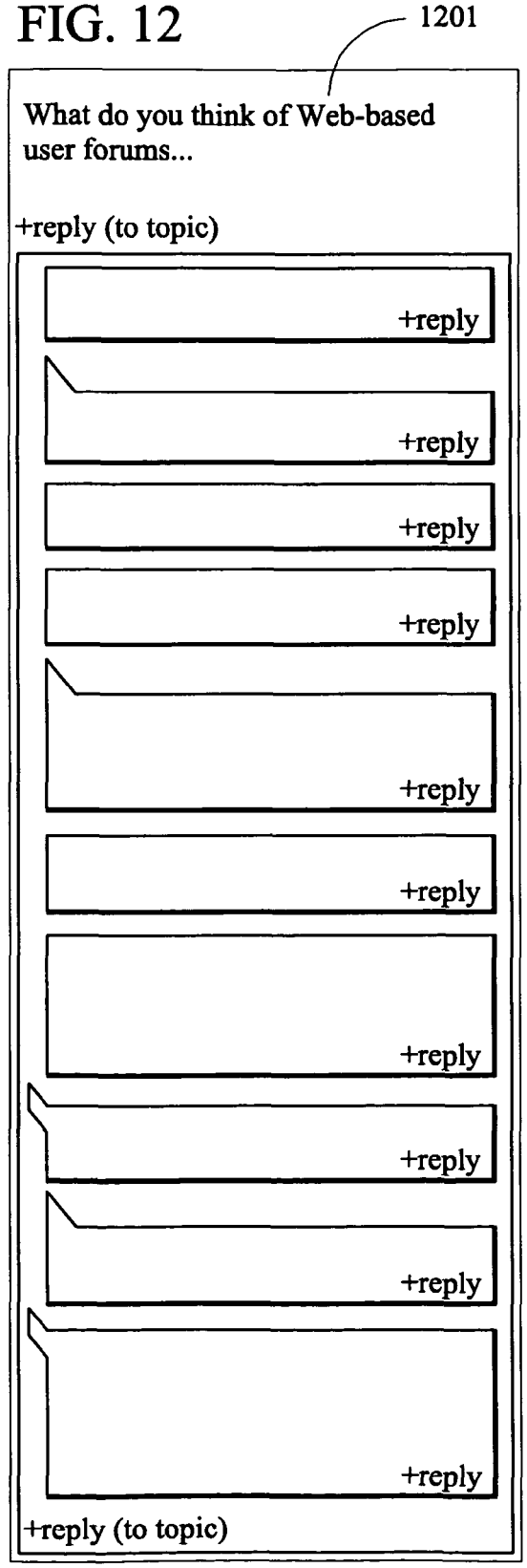

SYSTEM AND METHOD FOR NAVIGATING POSTS IN A DISCUSSION

TECHNICAL FIELD

The technical field comprises operator interface systems and methods. The technical field also comprises presentation processing systems and methods, and video interface systems and methods.

BACKGROUND

Various websites allow for comments on articles, photos, videos or other content, or provide forums for discussion.

In most cases, a root message provides the starting point for threaded discussions or communications. Any number of users may then be involved in creating reply messages, which are attached to the root message or other reply messages beneath the root message in parent-child relationships. The attachment reply messages create a logical hierarchical discussion tree structure beneath the root message. Because the content of each reply message is typically crafted in response to its parent message, it is useful for the user of such discussions to be able to discern the structure of the logical discussion tree. Many forms of threaded discussion exist. For example, the root message might be a photograph within an online gallery, or an article posted to a blog, and the replies might be considered as threaded comments. Another commonly encountered usage is within Internet user forums, where the root message and reply messages are considered similarly, but where the root message broadly defines the primary topic that the threaded discussion should pursue. Threaded discussions may also occur on internal company networks within local or wide area networks.

Early threaded discussion was used in dial-up bulletin boards and Usenet networks. These were gradually supplanted by the Web-based Internet user forums. The early bulletin board and Usenet networks were typically used by technically capable individuals, and were often associated with communities of computer scientists and academic organizations. Threaded discussions became more mainstream with the advent of the Web-based user forum.

The migration of threaded discussion to the Web presented two challenges. The first was the determination of the best user interface methodology allowing effective browsing and manipulation of hierarchical discussion trees within a two-dimensional graphical Web page. The second challenge was to make usage and participation in hierarchical discussion threads more user friendly than before, because the relative technical skills of users were diminishing as Internet usage became more widespread and mainstream within society.

FIG. 1 illustrates one prior art way to display a threaded discussion 10. Visual indentation of messages was used to communicate parent-child relationships. Each reply message 12, 14, 16, 18 or 20 is displayed indented in proportion to the number of parent posts existing above it in the discussion tree hierarchy, with the messages 12 and 20 displayed with a single level of indentation to indicate that they are in reply to (or children of) the root message. The reply 14 is displayed beneath reply message 12 to with an additional level of indentation to indicate that it has been made in reply to message 12. The reply messages 16 and 18 are displayed beneath message 14 with an additional level of indentation to indicate that they have been made in reply to message 14, with their relative ordering indicating that reply message 16 was posted before reply message 18. Generally the reply messages in the discussion tree that are children of a message are listed in the chronological order they were created directly beneath the message at an additional level of indentation, with the children of the children treated in the same manner, recursively. Message 20 is a reply to the root message and even if it were created before message 14, 16 or 18, it would still be displayed in the same position within the list after message 18, since the child messages of 12 must be displayed before it at a higher level of indentation.

Several problems exist with this methodology. One problem is that as a discussion tree gets deeper, the indentation of messages increases. This presents a problem because computer screens have a fixed width, which therefore forces users to scroll horizontally to reach messages that reside deep in a discussion thread. Another problem is that while this methodology graphically reveals the hierarchical structure of discussion thread trees, it does not allow for the creation of a sorted listing of the messages, for example in simple chronological order, because it would then no longer be possible to use indentation to correctly indicate parent-child relationships.

FIGS. 2A-2B illustrate a prior art way to display a threaded discussion 30, which uses the same example messages as in FIG. 1. Because of the aforementioned and other problems with the indentation approach illustrated in connection with FIG. 1, some user forums adopted an approach where messages 32, 34, 36, 38 and 40 are listed in order of creation, even though message 36 is in reply to parent message 32, and messages 38 and 40 are in reply to parent message 36, while messages 32 and 34 are in reply to the root message. In order to reveal the parent-child relationships existing between the messages to the viewer of the discussion thread, the bounding boxes used to display messages 36, 38 and 40, in addition to message content 42, 44, and 46, also contain another "quotation box" 48, 50 and 52 that contains at least some of the content of the parent message that the reply message is directly replying to. These quotation boxes are recursive in nature, so each quoted reply box 50 and 52, may in turn contain another quotation box 54 and 56, ad infinitum. In this example, messages 32 and 34 do not contain quotation boxes containing content excerpted from the root message, although this is a possible methodology, as is the deliberate exclusion of quoted content by the users adding reply messages.

The approach shown in FIGS. 2A-2B removes the need to indent messages to reveal the structure of the discussion thread. Furthermore, a listing of messages may be created in a particular order. However, other issues remain with this approach. Firstly, content becomes heavily duplicated throughout the page inside the quotation boxes, which can cause problems with certain systems like, for example, Web search engines. Secondly, the display of boxes within boxes can present as busy and confusing to the human eye. Additionally, structured or multi-media content cannot easily be represented inside the quotation boxes, and the space available for content inside the quotation box shrinks as the discussion thread deepens.

Attempts have been made to enable users to better interact with hierarchical discussion threads by offering alternative browsing modes. Continuing with the example messages used in FIG. 1 and FIGS. 2A-2B, FIG. 3 illustrates a browsing mode that combines a tree navigation control 72 that presents the structure of the hierarchical discussion thread, using snippets, 74, 76, 78, 80 and 82 of the content from messages 84, 86, 88, 90 and 92 as the titles of corresponding nodes in a graphical representation of the logical discussion thread structure, with the listing of the messages 84, 86, 88, 90 and 92, which are made, for example, in chronological order. The tree control thus displays a miniaturized tree representing the structure of the discussion thread that is arranged in a similar manner to message items arranged using the aforementioned indentation approach. When a node 94, 96, 98, 100 or 102 in this tree is clicked, the scrolling of the Web page typically jumps to bring the corresponding selected message 84, 86, 88, 90 or 92 into view so the selected message can be read.

While the tree navigator control approach shown in FIG. 3 allows for effective browsing of hierarchical discussion trees, there is the potential for horizontal scrolling issues within the tree control as the discussion thread deepens. Further, it fails to provide a positive experience for the majority of users for a variety of reasons, including the resultant jumps in the scrolling of the web page during usage. In practice, while some more technically proficient users may switch to the tree control mode when they specifically want to browse the hierarchical discussion structure, the majority of users avoid using this mode of operation entirely, and choose another mode of operation, which is typically the default, where messages are simply listed in chronological order in the manner of FIGS. 2A-2B without the inclusion of quotation boxes.

A problem then emerges, because users of the threading system often become unaware that a discussion thread hierarchy is being preserved at all. While each reply message may contain its own reply action button 104, 106, 108, 110, or 112, such users may click any reply button feeling they are simply replying to the general topic being discussed in the thread (as defined, for example, by the root post), or alternatively not replying specifically to the reply message they are actually meaning to reply to. The result is that the structure of the discussion thread hierarchy can become corrupted, in large part being meaningless, impacting those users trying to gain understanding of the discussion through the tree control.

The problems with the prior art approaches to hierarchical discussion threading have resulted in some people arguing for the abandonment of threading in online discussion altogether. The argument goes that since there is no effective manner for displaying threaded discussion, individual discussions should instead be presented as simple chronologically ordered lists of messages, where reply messages are crafted only in response to the root message rather than some preceding reply. It is also argued that if somebody wishes to diverge sufficiently from the general discussion topic, as defined by the root message, then they should actually create a new root message in order to begin a new separate threaded discussion.

SUMMARY

Some embodiments provide a method for navigating posts in a discussion including parent posts and child posts, a child post being in reply to a parent post, wherein a further reply can be made to a child post and wherein multiple child posts can be made in reply to respective parent or child posts, the method including receiving posts and storing posts; arranging posts in a discussion linearly one below another; and providing a parent navigator which, when actuated, causes a copy of a parent post to be inserted adjacent its child post.

Other embodiments provide a system for navigating posts in a discussion including parent posts and child posts, a child post being in reply to a parent post, wherein a further reply can be made to a child post and wherein multiple child posts can be made in reply to respective parent or child posts, the system including means for receiving posts and storing posts; and means for arranging posts in a discussion linearly one below another; means for defining a child navigator which, when actuated, causes a copy of a parent post to be inserted adjacent to its child post.

Other embodiments provide a computer readable medium bearing computer program code which, when executed by a server, causes the server to receive posts from discussions; store posts, including parent posts and child posts, a child post being in reply to a parent post, wherein a reply can be made to a child post and wherein multiple child posts can be made in reply to a single parent post, at least one post including text; and provide to a client access to: a formatter configured to arrange posts in a discussion linearly one below another; and a parent navigator which, when actuated, causes a parent post to be inserted adjacent its child post.

Still other embodiments provide a system for navigating posts in a discussion, including parent posts and child posts, a child post being in reply to a parent post, wherein a further reply can be made to a child post and wherein multiple child posts can be made in reply to respective parent or child posts, the system comprising a server including a communications device configured to receive posts; and a message store configured to store posts, the server being configured to provide to a client, using the communications device, access to: a formatter configured to arrange posts in a discussion linearly one below another; a parent navigator which, when actuated, causes a parent post to be inserted adjacent its child post; and; a child navigator which, when actuated, causes a parent post to be inserted adjacent its child post.

BRIEF DESCRIPTION OF THE VIEWS OF THE DRAWINGS

FIG. 1 is a screen shot of a prior art method of displaying a discussion where reply messages in a list are indented relative to parent messages, and their children are further indented.

FIG. 2 is a map showing how FIGS. 2A and 2B are to be assembled together.

FIG. 2A is a portion screen shot of a prior art method of displaying a discussion where each message is displayed with a box recursively displaying content from its parent messages.

FIG. 2B is a portion screen shot of a prior art method of displaying a discussion where each message is displayed with a box recursively displaying content from its parent messages.

FIG. 9 is a screen shot illustrating operation of a system and method in accordance with various embodiments, in a stream-oriented mode.

FIG. 10 is a screen shot illustrating operation of a system and method in the mode of FIG. 9 and illustrates how a copy of a root message might be inserted into a list.

FIG. 11 is a screen shot illustrating operation of a system and method illustrating operation in the topic mode to display a reply message listing beneath a root message (which might be a blog article, for example), in accordance with various embodiments.

FIG. 12 is a screen shot illustrating operation of a system and method illustrating operation in the topic mode to display a reply message listing in the form of a threaded instant messaging sequence where the root message acts simply as the definition of the context for discussion and is not displayed as a message.

DETAILED DESCRIPTION OF THE ILLUSTRATED EMBODIMENTS

The abandonment of discussion threading is not believed to be a satisfactory solution for online discussion. In discussions taking place in the offline world, for example between people in a meeting room, individuals do indeed make specific responses to each others' points during the course of a discussion, as well as making comments that only add to the general flow of a discussion. If the online world is to support discussions as sophisticated as those that occur in the offline world, it is believed threading should indeed be supported in some form. Some embodiments described below actually add additional capabilities to online discussion with the aim of advancing it beyond offline discussion.

Figures 2, 2A:
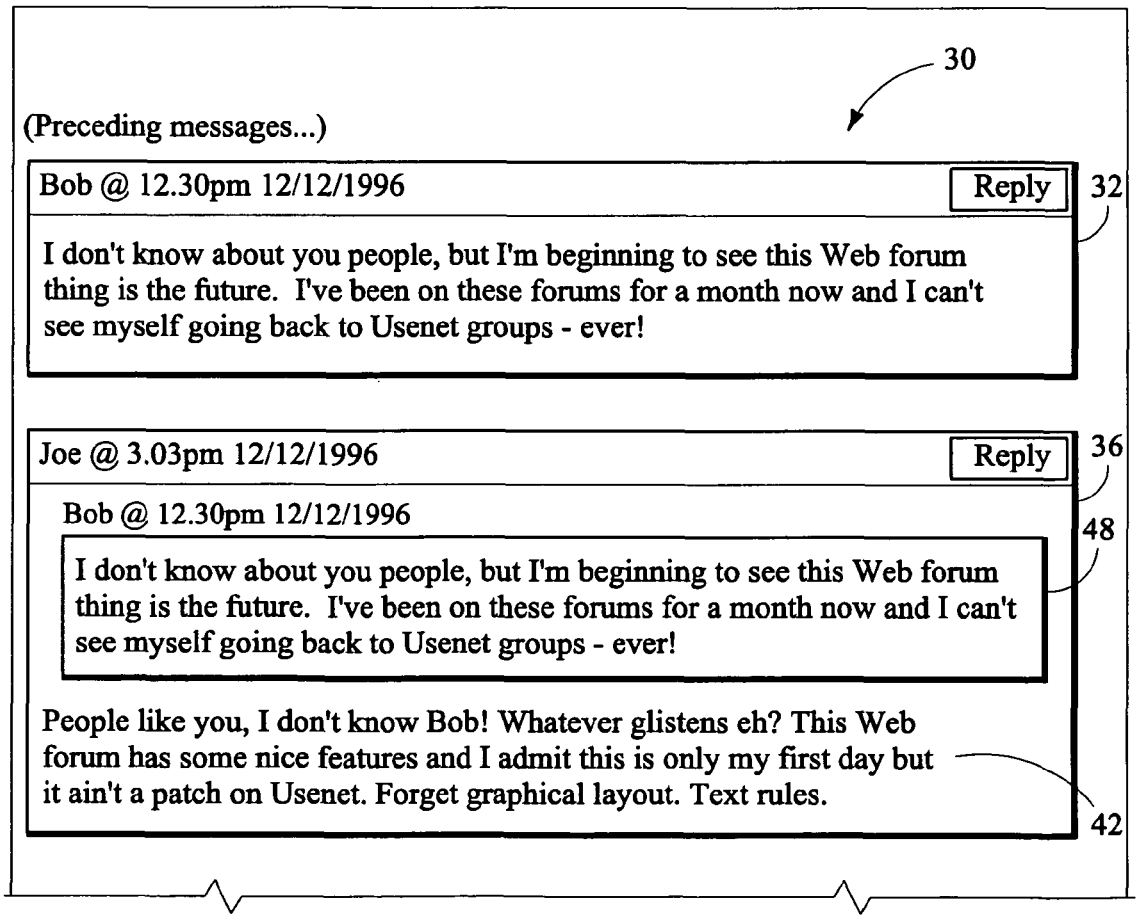
Figure 3:
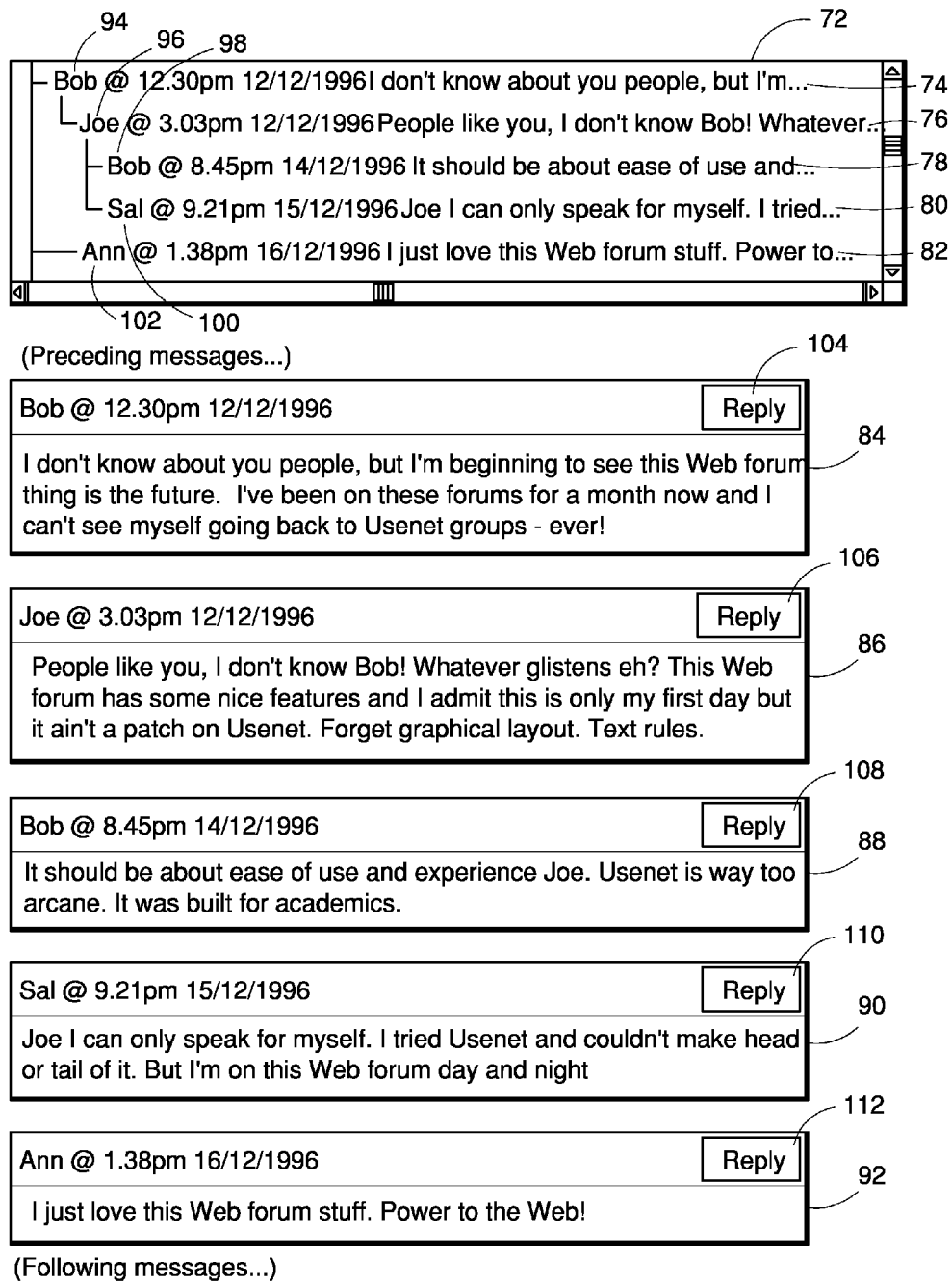
FIG. 3 is a screen shot of a prior art method of displaying a discussion where a separate tree navigation control is provided to reveal and allow navigation of the logical discussion structure.
Figure 4:
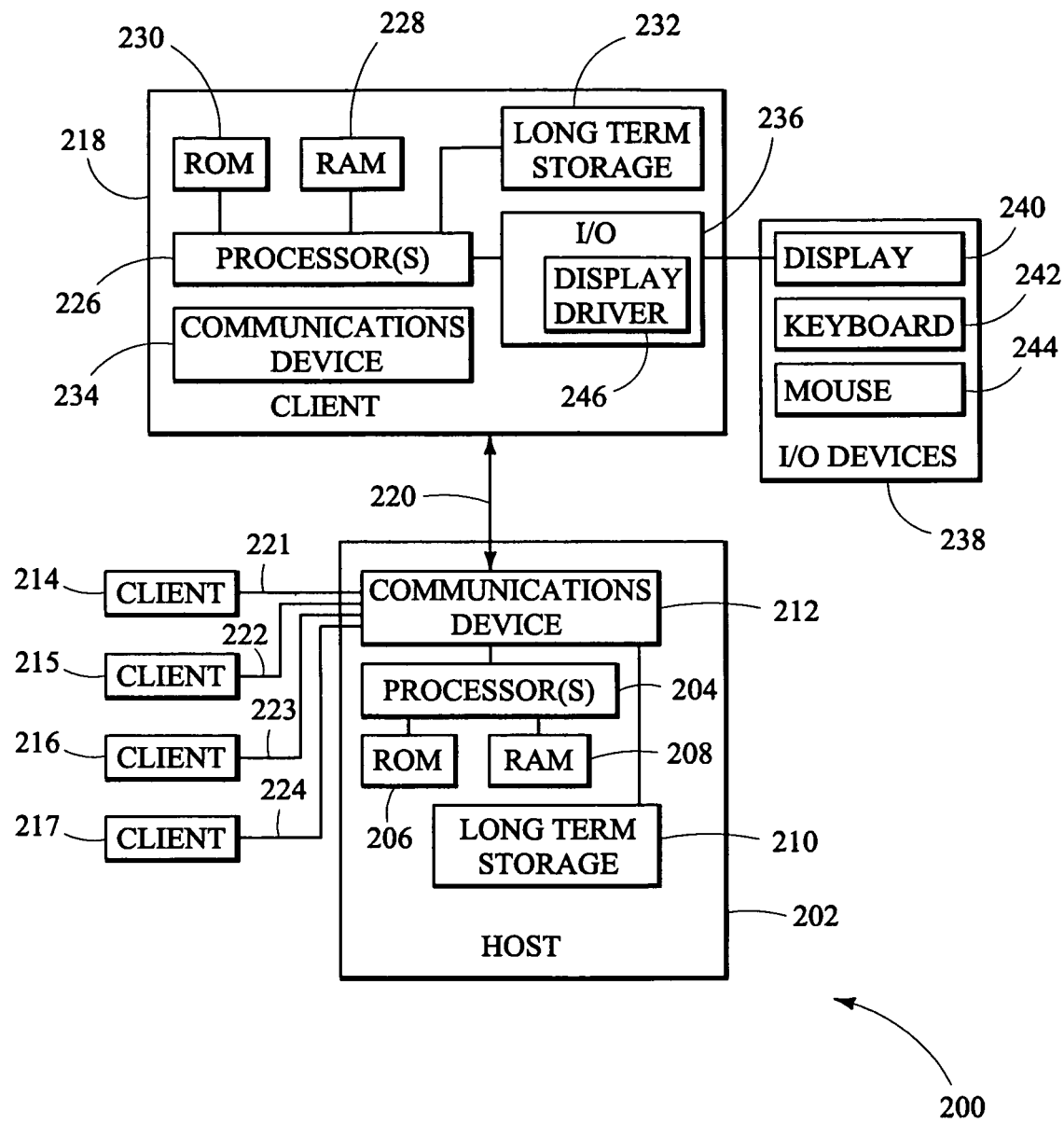
FIG. 4 is a block diagram of a system in accordance with various embodiments.

FIG. 4 shows a system 200 in accordance with various embodiments of the invention. The system 200 includes a host device 202 which may be defined, for example, by a server. The host device 202, in some embodiments, hosts discussion sessions. In the illustrated embodiment, the host device 202 includes one or more processors or processor cores 204. The host device 202 further includes short term or local memory such as random access memory 208, read only memory 206, or both RAM and ROM. This short term memory is used during execution of code. In some embodiments, a common IC chip includes both a processor and short term memory, though additional short term memory may also be included outside the IC chip. In other embodiments, the processor 204 does not include on-board short term memory. The host 202 further includes long term storage 210 such as one or more hard drives, a RAID array, a magnetic tape drive, or other long term data storage. The host 202 further includes one or more communications devices 212 such as modems, network interface devices (for connection to a local area network, to external communication devices, or to external communication devices via the local area network), wireless communications devices, or other types of communications devices appropriate for use in communicating with multiple client devices. The host 202 many include any other hardware and software commonly used in servers, such as Web servers or local area network servers. While one server is illustrated, in alternative embodiments, multiple servers can be employed.

The system 200 further includes a plurality of clients 214, 215, 216, 217, and 218 that may variously connect or disconnect from the host 200 via communications links 220, 221, 222, 223, and 224 which may respectively be wired communication links, wireless links, or a combination of wired and wireless between a client and the host.

An exemplary client is client 218. The client 218 includes one or more processors or processor cores 226. The client 218 further includes short term or local memory such as random access memory 228, read only memory 230, or both RAM and ROM. The short term memory is used during execution of code. In some embodiments, a common IC chip includes both a processor and short term memory, though additional short term memory may also be included outside the IC chip. In other embodiments, the processor 226 does not include on-board short term memory. The client 218 further includes long term storage 232 such as one or more hard drives, a RAID array, a magnetic tape drive, or other long term data storage. The client 218 further includes one or more communications devices 234 such as modems, network interface devices, wireless communications devices, or other types of communications devices appropriate for use in communicating with the host 202 either directly or via a network.

The client 218 further includes one or more input/output devices 236 for use in connecting the client 218 to I/O devices 238 such as a display 240, a keyboard 242, a mouse 244, or other I/O devices included in the system 200. In some embodiments, the display 240 is a touch screen device and the keyboard 242 may be omitted. In the illustrated embodiment, the input/output device 236 includes a display driver 246 for transforming digital data into visual images visible on the display 240. The client 218 may include any other hardware and software that can be included in a personal computer.

The other clients 214, 215, 216, and 217 include the same or similar hardware as client 218.

Figure 14:
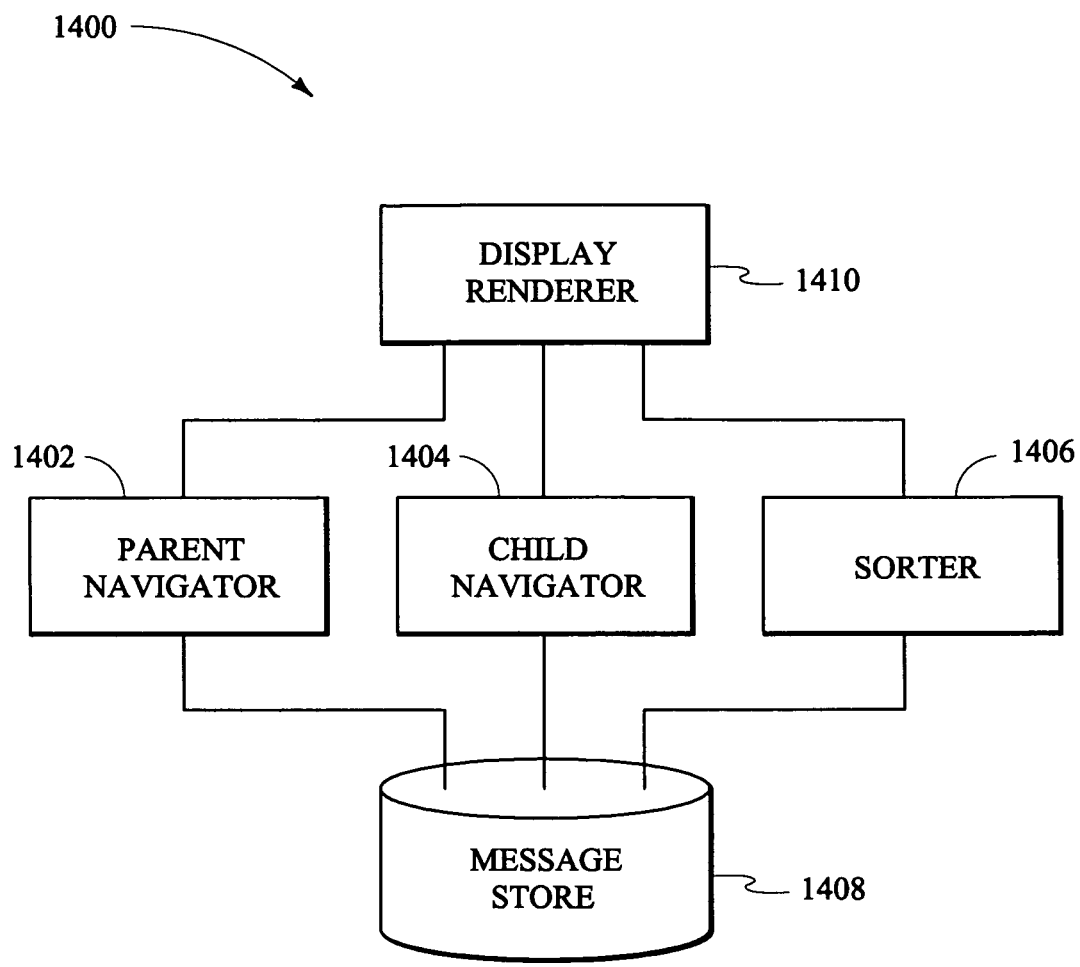
FIG. 14 is a functional block diagram of a system in accordance with various embodiments.

FIG. 14 is a functional block diagram of a system 1400 in accordance with various embodiments. The system 1400 includes a parent navigator 1402, a child navigator 1404, a sorter 1406, a message store 1408 and a display renderer or formatter 1410. These will be described in greater detail below. In some embodiments, the display renderer or formatter 1410 comprises computer program code such as html or code executed by a client for sorting posts and arranging them on a screen (e.g., with scroll bars if necessary). In some embodiments, the formatter 1410 comprises computer hardware for driving a display, such as a display driver card or hardware.

Various embodiments provide systems and methods that enable users to browse messages in hierarchical discussion threads which can be viewed, created, or added to using clients 214-218. Such discussion threads might be, for example, a thread in an Internet user forum, or the comments appearing beneath an online video or blog article. Various embodiments provide a linear listing of messages or posts from such a threaded discussion, which may be filtered or sorted according to a variety of criteria, where each message is displayed using one of three base types of message framework. In some embodiments, the messages may be sorted by sorter 1406 in at least some of the following manners: newest to oldest, oldest to newest, most viewed, most replied to, most voted, by kudos of the author (e.g., number of kudos an author has received), alphabetically by author, or any other desired manner of sorting. In some embodiments, the messages may be filtered by tag, author, or any other desired manner of filtering. The term "framework," as used herein, refers to a graphic or bubble surrounding or proximate to a message. In some embodiments, the message frameworks provide users that browse the listing with some initial information about their position within the hierarchical logical discussion thread structure, which is a tree, and host actions enabling users to navigate from any message in the listing to its siblings within the logical discussion thread structure by causing copies of those siblings to be inserted as siblings of the chosen message in the linear message listing. Various embodiments are provided including "topic-oriented" and "stream-oriented" forms. A mode selection allowing toggling between "topic-oriented" and "stream-oriented" modes is also possible.

In the topic-oriented embodiments, the root message of the discussion does not appear in the linear listing of messages, and is usually displayed somewhat separately. In these embodiments, the root message typically defines the topic that directs the discussion. For example if the root message is an online video, blog article or online newspaper article, and the comments beneath the root message provide the linear message listing.

In the "stream-oriented" forms, the linear message listing may include the root message. This is typically used where a system designer does not wish to elevate the root message to any special status, for example within an Internet user forum discussion thread. Various graphical designs of the message frameworks can be employed and the figures illustrate just one possibility, by way of example only. Similarly, various layouts are possible for discussion thread components. These can be tailored to specific applications and based on taste or style.

Figure 5:
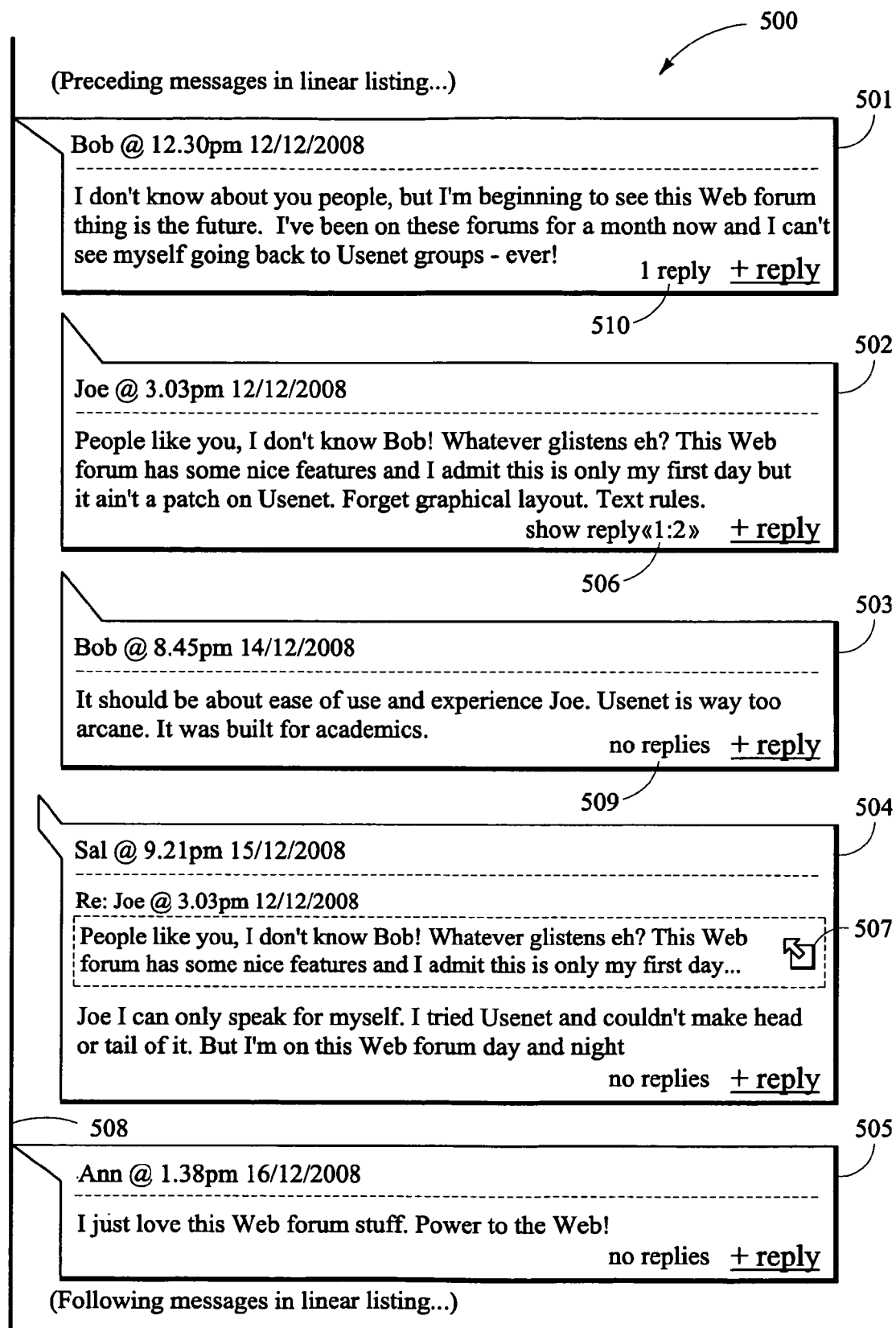
FIG. 5 is a screen shot illustrating operation of a system and method in accordance with various embodiments, in a topic-oriented mode.

With reference to FIGS. 5 and 10, the usage of three different types of message framework in two example listings of discussion messages made by the topic-oriented and stream-oriented embodiments, respectively, are apparent. A "Type I" message framework, as used by the message labeled 502, indicates that a message is a child of a specific message in the logical discussion structure where the message also happens to be a sibling in the linear listing of messages. In the example listing of FIG. 5, the message labeled 502 is a child of (has been made in logical reply to) a message labeled 501. A "Type II" message framework, as used by the message labeled 504, indicates that a message is a child of a message that is not a sibling in the linear message listing. A "Type III" message framework, as used by the message labeled 501, has a different meaning depending upon which form is being used.

In the topic-oriented forms, a Type III framework indicates that a message is a child of the root message. Referring to FIG. 5, the Type III framework used by the message labeled 501 therefore indicates that the message is a child of (can be considered as responding to) the root message. In the example listing shown, an example graphical format for the framework has been used that helps visually convey to users that the content of the message has been crafted in direct response to the main discussion topic 508, where the discussion topic 508 is defined by the content of the root message (not shown in FIG. 5). In the stream-oriented forms, a Type III framework indicates that a message is the root message. Referring to FIG. 10, the Type III message framework used by the message labeled 1001 indicates that this message is the root message in a listing 1000. In the example graphical format, the Type III message framework used by message 1001 does not have a graphical callout feature which visually indicates that it is the root message of the discussion and thus has not been crafted in response to a reply message.

In various embodiments, the system defines how messages should appear within the linear message listing, and defines ways the user may interact with the messages while browsing the logical discussion structure. The message listing may be used as a component of many different types of discussion thread system. For example, referring to FIGS. 11 and 12, two example schematic layouts of how a discussion thread might be displayed in the topic-oriented forms are shown. In FIG. 11, a root message 1101 is shown as a content article that forms the topic of the discussion, for example as might be the case if it were a video, blog article or online newspaper article and the reply messages are considered comments. In FIG. 12 the root message 1201 is displayed as a topic context within which a discussion can take place, for example where the listing of reply messages comprises an instant messaging sequence. Various embodiments may be employed in various different types of discussion systems (e.g., comments on videos, blog articles, online articles, or other content, instant message sequences, chat sessions, email discussions, or forum discussions).

Referring to FIG. 10, an example listing 1000 of messages displayed in a stream-oriented form is shown. In this variation, a linear listing of messages includes the root message 1001, which is treated similarly to a reply message 1002 This variation may be suitable, for example, for Internet user forum threads, or situations where the root message is considered to be of equal importance to reply messages, as might occur in a sequence of online chat or email messages. Messages 1002-1005 correspond to messages 502-505 of FIG. 5. Reference numeral 1006 points to a child navigation control and reference numeral 1007 points to an expand parent control.

Figure 13:
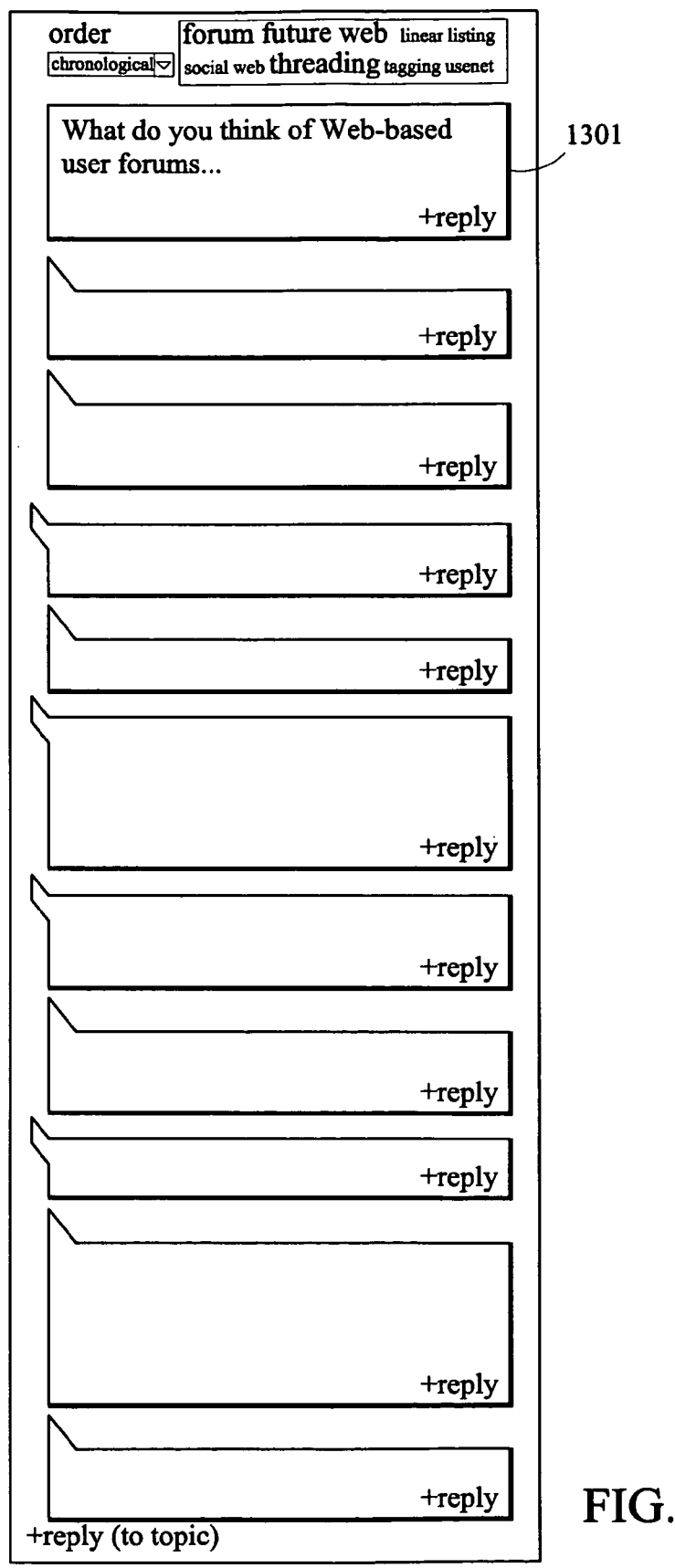
FIG. 13 is a screen shot illustrating operation of a system and method illustrating operation in the stream mode to display a linear listing of messages in which the root message is treated no differently to the reply messages.

FIG. 13 shows a possible schematic layout for a discussion thread in the stream-oriented variation where the root message 1301 is displayed within the linear listing of messages. Various embodiments provide for a listing of messages to be sorted and filtered according to any criteria (e.g., most popular, newest first, oldest first, alphabetically by author, etc.), using (see FIG. 14) the sorter 1406, so the root message may or may not appear, and may or may not appear as the first message in the linear listing. Other schematic layouts are possible.

While the frameworks used to display messages in the linear listing forms provide some initial information about the relative position of messages within the hierarchical logical discussion tree structure, for example whether a message is a child of a message in the linear listing, in various embodiments it is the actions hosted by the frameworks that enable users to reveal and browse the complete underlying logical discussion tree structure. As shown in FIG. 14, the system includes a parent navigator 1402. More particularly, the Type II message framework hosts an "expand parent" action that actuates the parent navigator 1402 to reveal the parent message within the logical discussion structure, by insertion of a copy of the parent message as a sibling in the linear list (e.g., proximate, adjacent, immediately above or immediately below a child message for which an expand parent action has been selected). For example with reference to FIG. 5, the message labeled 504 has a Type II framework and is a child of the message labeled 502. In this example, the user can execute the hosted expand parent action of the parent navigator 1402 by actuating (e.g., clicking on) a snippet of content or on a control 507 in a snippet of content from parent message 502 that is quoted within child message 504.

Thus, in some embodiments, the parent navigator 1402 causes the insertion of a copy of the parent adjacent to the child post. It is possible that a 3D rendering of posts can take place or that the copy of the parent message could be shown as hovering proximate a child message. In some embodiments, the term "adjacent" encompasses hovering of a copy of the parent post proximate the child post.

Figure 6:
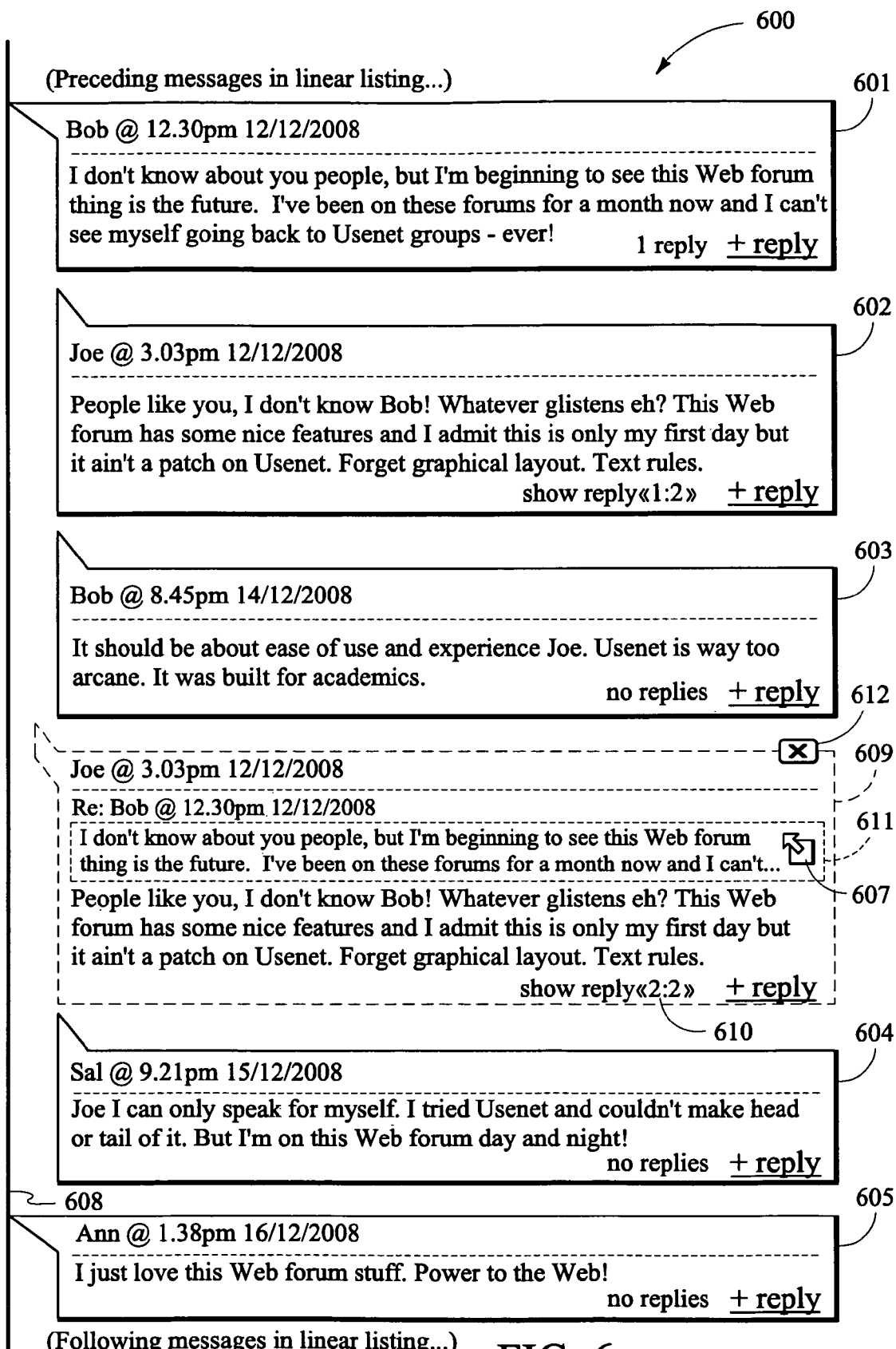
FIG. 6 is a screen shot illustrating operation of a system and method in the mode of FIG. 5, illustrating how a copy of a parent of a reply message is inserted into a list, in various embodiments.

FIG. 6 shows changes that occur to the thread listing 500 displayed in FIG. 5 in response to the aforementioned expand parent action. Messages 601, 602, 603, and 605 correspond to messages 501, 502, 503, and 505 of FIG. 5, respectively. The expand parent action causes a copy of the parent message labeled 602 to be inserted into the linear list in the form of a duplicate message labeled 609 positioned as a sibling (e.g., above or below) the message labeled 604. When messages are added to or deleted from the linear list, the system updates the frameworks used by messages to reflect the new sibling relationships accordingly. In FIG. 6, message 604 now has its parent (or rather, a copy of its parent) displayed directly above it as a sibling in the listing. This means that while in FIG. 5 this message has a Type II framework, the system automatically changes this to Type III in FIG. 6 to reflect the new parent-child relationship with its sibling.

In reference to FIG. 6, it can be seen that the framework of the message labeled 609 is drawn using a dashed line or otherwise distinguished to indicate that it is a copy of another message that has been inserted into linear listing 600, and that consequently its presence and position in the listing has not been determined by any sorting or filtering that is applied to the other messages in the linear listing 600. As before, the graphical format used to display message frameworks, including provision for indicating a message has been inserted into the linear listing, is not limited, and any appropriate graphical form can be employed. In the example shown in FIG. 6, the message framework of the inserted message 609 also includes a close action control 612, but this is not required. However, in the illustrated embodiment, inserted messages should be displayed using the message framework that correctly reflects the sibling relationships that stem from their own particular position within the linear listing of messages, rather than those of the principal message they duplicate, wherever the principal message may be within the linear listing of messages, and therefore message 609 is displayed using a Type II message framework.

Because the message copy labeled 609 in FIG. 6 is displayed within a Type II framework, it hosts its own expand parent action 611. If this is executed it causes a copy of the parent of the message it represents to be inserted into the linear listing.

Reference numeral 608 indicates the main topic.

Figure 7:
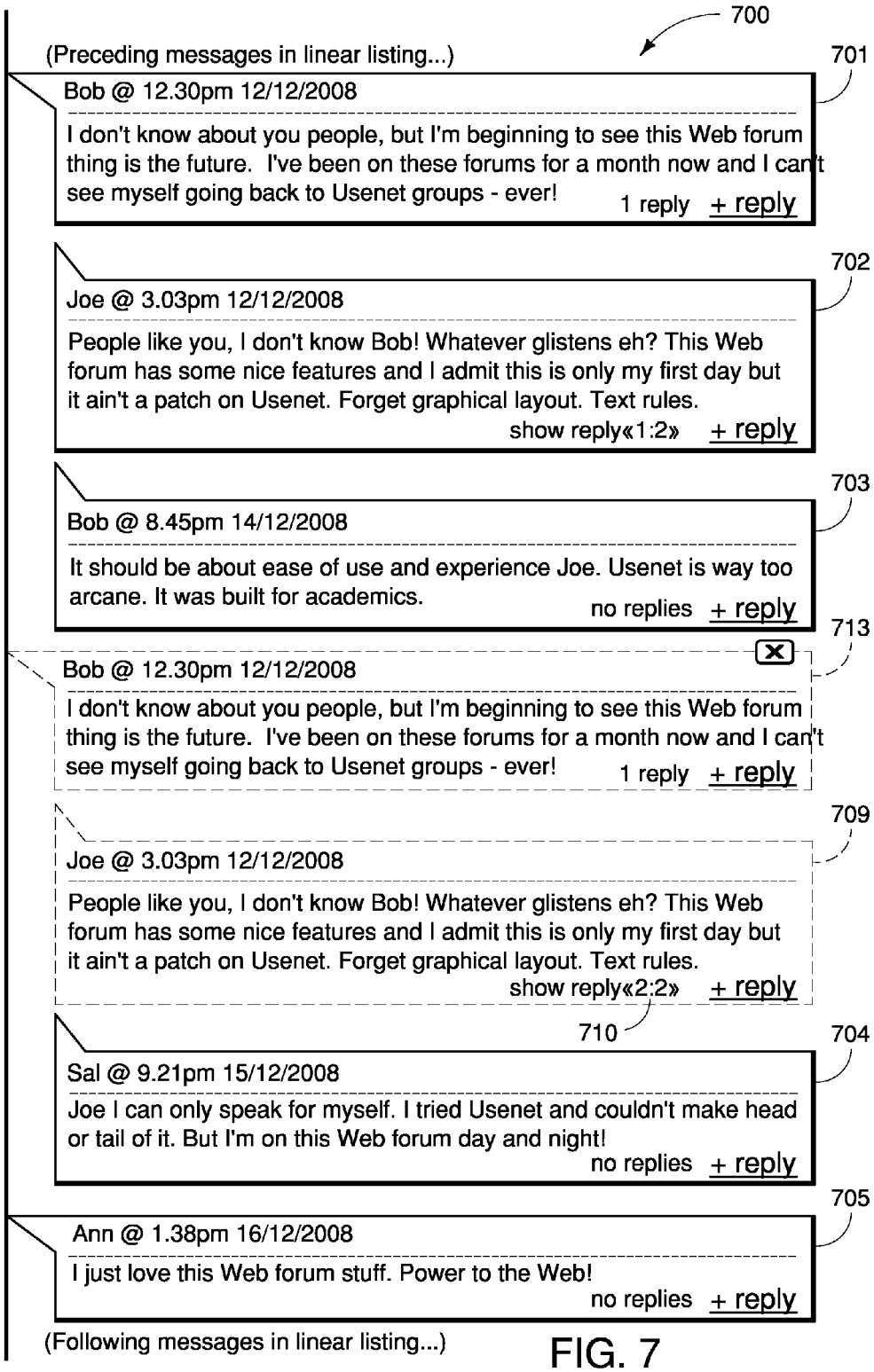
FIG. 7 is a screen shot illustrating operation of a system and method in the mode of FIG. 6, illustrating how a copy of a parent message of a previously inserted parent message is inserted into the list, in accordance with various embodiments.

FIG. 7 shows the changes occurring to the example message listing 600 displayed in FIG. 6 after the aforementioned expand parent action has been executed by actuating a control 607 or a snippet of text such as the text included in the dashed lines that also include the control 607. Messages 701, 702, 703, 704, 705 and 709 of listing 700 correspond to messages 601, 602, 603, 604, 605 and 609 of FIG. 6, respectively. The action has caused a copy of the message labeled 701, which is the parent of the message 702 (and hence of its duplicate 709) to be inserted into the linear list in the form of a duplicate message labeled 713 positioned as a sibling to the message labeled 709. The message framework used for message 709 has been updated from Type II in FIG. 6 to Type I in FIG. 7 to indicate that it is now a child of its sibling 713. Reference numeral 710 points to a child navigation control and corresponds to reference numeral 610 in FIG. 6. Generally speaking, in the illustrated embodiment, a user can successively use the parent navigator and hosted expand parent actions to navigate up the logical discussion thread tree hierarchy until a copy of a direct reply to the root message, or the root message itself, is inserted into the list, depending upon whether the topic-oriented or stream-oriented form respectively is being used.

As well as enabling users to navigate upwards in the logical discussion thread structure, from parent to parent towards the root message, various embodiments enable navigation to any descendent reply message of a chosen message, through the successive insertion of copies of child messages into the linear listing of messages using child navigation actions hosted by the message framework. Where a message does not have any child reply messages, this is indicated in some embodiments, for example by replacing the child navigation actions with the text "no replies". Where the message only has a single child message, and this is already a sibling (in an expected position within the linear listing, for example below the message), this is indicated, in some embodiments, for example by replacing the navigation actions with text such as "1 reply". The navigation actions should allow for copies of the child messages to be inserted, where they do not already exist, as siblings, where each inserted copy replaces any copy previously inserted using the child navigation actions.

With reference to FIG. 5 the message labeled 502 hosts an example child navigation control 506, that actuates the child navigator 1404 of FIG. 14 that makes this possible. The child navigation control 506 in the illustrated example indicates that the first of two child messages 503 currently exists as an immediate sibling message to the parent message 502 in the linear listing of messages. Note that the design of the child navigator 1404 and child navigation control is not limited to the illustrated interface design, and any design tailored for a particular application can be employed. The design of the navigator 1404, in various embodiments, will indicate one or more of the following: (i) whether a message has no child reply messages, for example navigation control or indicator 509, (ii) whether a message has one or more child reply messages, one of which is currently a sibling in the linear listing, for example indicator 510 or for example navigation control or indicator 506, or (iii) whether a message has one or more child reply messages but none currently is a sibling in the linear listing. In some embodiments, if a message has a child message that is currently a sibling in the linear listing that is immediately below the message, then the child navigator 1404 will indicate which of the child messages is immediately below by indicating the current index of the child message in the sequence of all child messages ordered chronologically by age. In some embodiments, the child navigator 1404 hosts actions enabling users to cause the insertion of previous and following child messages from the chronological sequence of child messages as sibling messages below the parent message, with each inserted child replacing any previously inserted child.

With reference to FIG. 5 the message labeled 502 currently has one of its child messages 503 as a sibling below it in the linear listing of messages. Message 503 is displayed using a Type I message framework accordingly. The child navigation control 506 hosted by message 502 indicates that the child message 503 is the first child in the chronologically ordered sequence of all its children. Message 504 is also a child of message 502 in the logical discussion structure, but it is not a sibling in the linear listing of messages.

Figure 8:
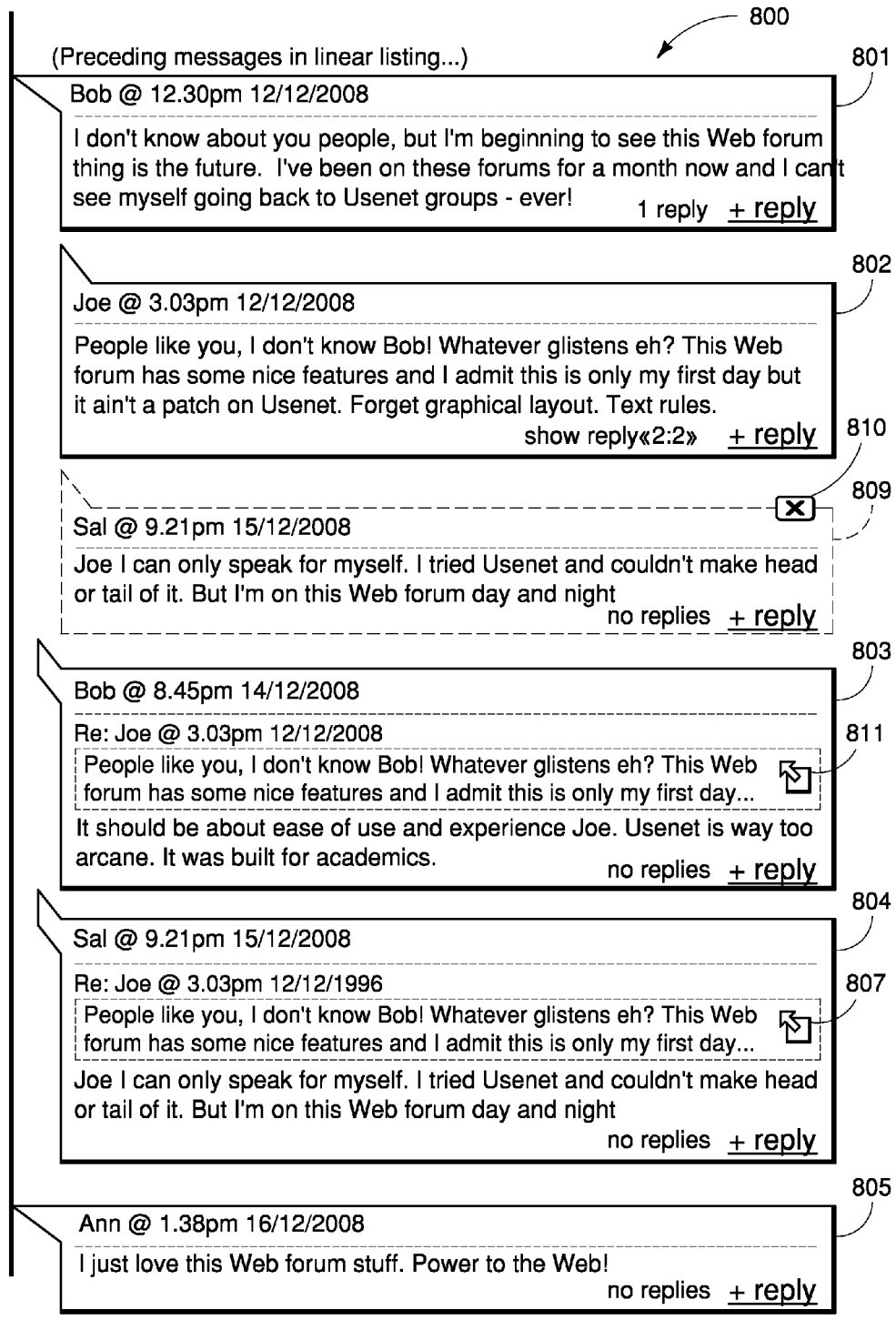
FIG. 8 is a screen shot illustrating how a copy of the child message of a reply message of FIG. 5 might be inserted into the list, in accordance with various embodiments.

FIG. 8 shows the changes occurring to the example message listing 500 displayed in FIG. 5 after an action provided by the child navigation control 506 is executed causing the next child of message 502 to be displayed as a sibling in the linear listing of messages. Messages 801, 802, 803, 804 and 805 of listing 800 correspond to messages 501, 502, 503, 504 and 505 of FIG. 5 respectively. The action has caused a copy of the message labeled 504 to be inserted into the linear list in the form of a duplicate message labeled 809 positioned as a sibling to the message labeled 802. Message 809 is displayed using a Type I framework to indicate that the message is a child of sibling message 802. Message 803 is no longer a sibling of its parent message 802 after the insertion of 809, and consequently its framework is updated to a Type II framework. In this embodiment, if message 802 had a third child, and the discussed child navigation action was repeated, duplicate child message 809 would be replaced by a duplicate of the third child message. In this embodiment and with this specific example, if the discussed child navigation action was repeated the duplicate child 809 would simply be removed, returning the message listing to the state illustrated in 500 whereupon the first child of 802 would again become sibling. Reference numerals 807 and 811 point to expand parent controls and correspond to the control 607 of FIG. 6. Reference numeral 810 points to a close control and corresponds to the close control 612 of FIG. 6.

Thus, in some embodiments, the child navigator 1404 causes the insertion of a copy 809 of the child adjacent to the parent post 802. It is possible that a 3D rendering of posts can take place or that the copy 809 of the child message could be shown as hovering proximate a child message. In some embodiments, the term "adjacent" encompasses hovering of a copy of the child post proximate the parent post.

FIG. 9 is a screen shot illustrating operation of a system and method in a stream-oriented embodiment where a linear message listing 900 may include the root message. Messages 901-905 correspond to messages 801-805 of FIG. 8. Reference numeral 907 points to an expand parent control, reference numeral 906 points to a child navigation control.

With reference to FIG. 6 the duplicate message 609 that has been inserted due to the execution of the expand parent action of message 504 in FIG. 5, as previously discussed, also hosts a child navigation control 610. In this embodiment, it is possible to explore the children of any message from a duplicate of that message that has been inserted into the linear message listing using the child navigation control that is hosted by the duplicate message. Using this embodiment, therefore, the user is free to reveal the parent and child messages of any displayed message, regardless of whether it is a principal message such as 602 or a duplicate message such as 609, and then use the revealed messages as starting points for further traversal of messages. A benefit of this is that even if filtering is applied to the linear message listing, for example allowing only messages that have a specific tag to be present, any single message present in the filtered list may be used as a starting point for traversing and exploring the logical discussion structure if that is so desired.

In some embodiments, a majority of computer program code is executed at the host 202 (see FIG. 4). In other embodiments, a majority of computer program code is executed at the clients 214-218. More particularly, in some embodiments, at least one of the child navigator 1404 and parent navigator 1402 (see FIG. 14) are executed on the host 202, and the host 202, in operation, receives page requests from clients 214-218. In other embodiments, applets are transferred to clients and at least one of the parent navigator 1402 and child navigator 1404 are executed at the clients 214-218. For example, browsers on clients can be sent applets from the host server 202. In some embodiments, computer program code executes in a web browser on a client 214-218, the code makes calls into the host 202, and the host 202 returns content and information about the content's structure. In some embodiments, the message store 1408 at least primarily resides on the host 202, and an appropriate number of posts from a discussion are sent to clients for viewing based on requests by the clients 214-218. Posts or messages can also be received, of course, at the host 202 from clients 214-218 and are stored in storage 210 of the host 202. In some embodiments, certain messages are kept in a cache in clients 214-218 for later use by the child navigator or parent navigator, for when copies are to be inserted in a discussion, for increased speed and efficiency.

Figure 15:
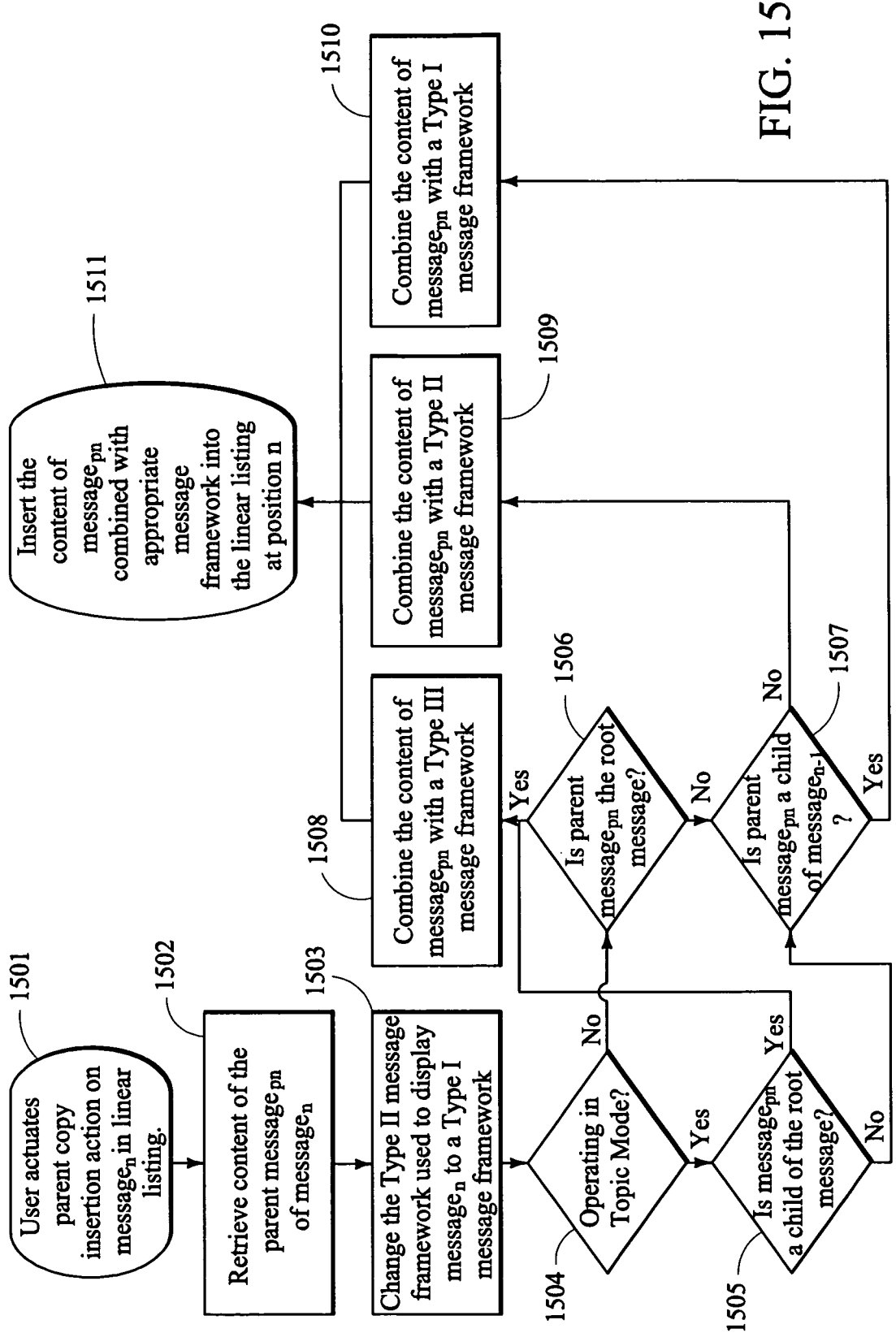
FIG. 15 is a flow chart describing how a copy of the parent message of a chosen child message is inserted into a linear listing as a sibling of the child message.

With reference to FIG. 15 a flow of logic that is executed, in various embodiments, when a parent expansion action has been executed is illustrated. The process can start, for example, at 1501 when, for example, the user actuates the parent copy insertion action hosted by the Type II message framework of message$_n$ in the linear listing of messages. The content and data describing parent message$_{pn}$ of message$_n$ is then retrieved 1502. The location from where this data is retrieved will depend upon the embodiment, and the exact state of the system in which the logic is executing. For example, if the rendering of the linear list and its updates occurs within the host, as may be the case where the invention forms part of the code executing on a Web server producing HTML representations of the linear listing, then the message data will likely be retrieved from the message store 1408 in FIG. 14. Alternatively, if the construction of the linear listing and updates to the linear listing occurs within the client, if for example as the result of the host 202 (see FIG. 4) serving code to the client 214-217 for execution within its Web browser, such as a Flash or Silverlight applet, or a Javascript application, then the message data may be retrieved from the message store using, for example, Web service communication, or if available alternatively from message data that has already been retrieved by the client code and which can be used in the way of a cache to accelerate interactive performance.

After the content and data describing message$_{pn}$ has been retrieved 1502, the message framework used to display the message$_n$ is changed from a Type II framework to a Type I framework 1503, to indicate that message$_n$ is a child of the duplicate parent message$_{pn}$ that the process will insert as a sibling, typically above it in the linear listing. In various embodiments of the invention, step 1503 may be delayed until after the parent message has been inserted. Next, the process examines 1504 whether the topic mode or stream mode is being employed. (In some embodiments, this examination 1504 is not performed by computer program code but the logic flow varies depending on whether topic mode or stream mode is being employed). If the stream mode is being employed, that is, topic mode is not being employed, then the process next examines whether parent message$_{pn}$ is actually the root message of the discussion 1506. If this is the case, then the content and data describing message$_{pn}$ are combined with a Type III message framework 1508 and inserted into the linear listing of messages 1511, whereupon the process is complete.

If the parent message$_{pn}$ is determined not to be the root message of the discussion 1506, then the process next examines whether the parent message$_{pn}$ to be inserted is a child of message$_{n-1}$ at position n$_{-1}$ in the linear listing 1507. If parent message$_{pn}$ is not a child of message$_{n-1}$ then the content and data describing message$_{pn}$ are combined with a Type II message framework 1509 and inserted into the linear listing at position n 1511. If parent message$_{pn}$ is a child of message$_{n-1}$ then the content and data describing message$_{pn}$ are combined with a Type I message framework 1510 and inserted into the linear listing at position n 1511.

If the topic mode is being employed 1504, the process next examines whether message$_{pn}$ is a child of the root message 1505. If message$_{pn}$ is a child of the root message then the content and data describing $message_{pn}$ are combined with a Type III message framework 1508 and inserted into the linear message listing at position n 1511. If $message_{pn}$ is determined not to be a child of the root message in 1505 then it is determined whether $message_{pn}$ is a child of $message_{n-1}$, and the process proceeds as described before.

Figure 16:
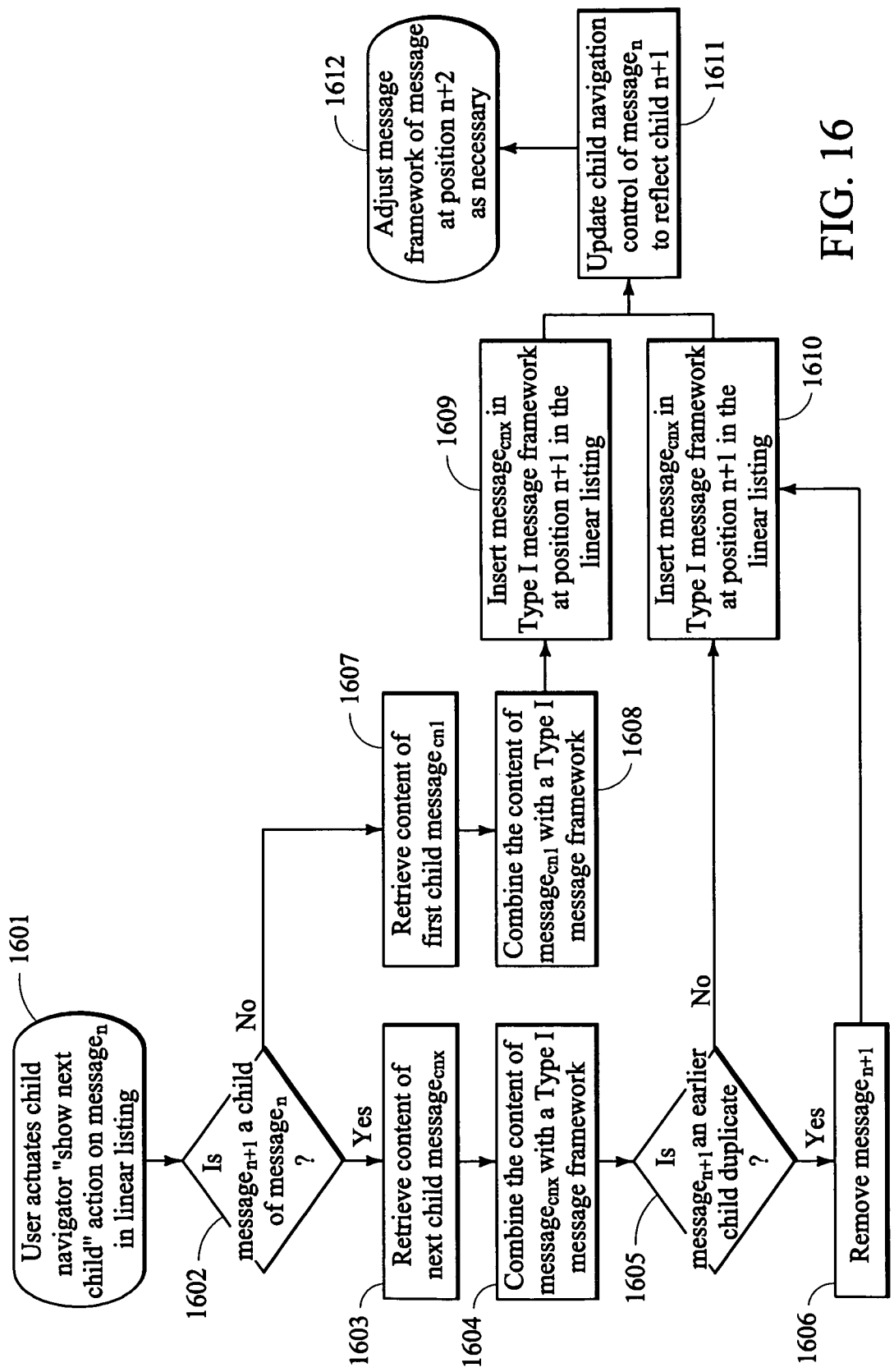
FIG. 16 is a flow chart describing how a copy of a child message of a chosen parent message is inserted into a linear listing as a sibling of the parent message.

With reference to FIG. 16, a flow of logic employed by various embodiments when an action hosted by the child navigator has been actuated with the purpose that the next child be displayed as a sibling message in the linear listing of messages. The process can start, for example, at 1601 when the user actuates a "show next child" action hosted by the child navigation control of $message_n$ at position n in the linear listing of messages 1601. Next the process examines whether $message_{n+1}$ at position n+1 in the linear listing of messages is already a child of $message_n$ 1602. If $message_{n+1}$ is a child of $message_n$, then the content and data describing child $message_{cnx}$ are retrieved. The $message_{cnx}$ is typically selected from the chronological sequence of the child messages of $message_n$, such that the index of $message_{cnx}$ in the sequence is one greater than the index of child $message_{n+1}$, or is the first message in the sequence if $message_{n+1}$ is the last message in the sequence.

In step 1604 the data and content describing $message_{cnx}$ are combined with a Type I message framework. The process then examines 1605 whether $message_{n+1}$ is a duplicate copy of a child that has previously been inserted into the linear listing of messages as a consequence of the child navigation process of FIG. 16 or a related child navigation process. If $message_{n+1}$ is a previously inserted duplicate of a child message of $message_n$, then the process removes the duplicate child $message_{n+1}$ 1606, and, if not, then the process proceeds to 1610. After removing the duplicate message the process proceeds to 1610, where $message_{cnx}$ is inserted into the linear listing at position n+1 using a Type I message framework. The process then proceeds to update the child navigation control hosted by $message_n$ so that it correctly indicates the index of $message_{cnx}$ within the chronological sequence of its child messages 1611.

If in step 1602 it is determined that $message_{n+1}$ at position n+1 in the linear listing of messages is not a child of $message_n$ at position n in the linear listing of messages, then the process proceeds to retrieve the content and data of $message_{cn1}$, which is typically the first child of $message_n$ in the chronological sequence of its child messages 1607. The content and data of $message_{cn1}$ are then combined with a Type I message framework 1608, and inserted into the linear listing of messages at position n+1 1609. The process then proceeds to 1611. In 1611, the child navigation control hosted by $message_n$ is updated so it reflects child n+1. After 1611, the process updates the type of message framework used to display the message at position n+2 in the listing if its parent-child relationship with the message at position n+1 has changed 1612, and the process completes.

Various aspects of the disclosure can be defined by hardware, such as digital logic circuitry analog logic circuitry, or a combination of digital and analog circuitry, in software, or in a combination of hardware and software elements.

Furthermore, various aspects provide a computer readable medium providing program code for use by a computer or other instruction execution system. For the purposes of this description, a computer-usable or computer readable medium can be a hard drive, a floppy drive, a magnetic tape, a floptical drive, a solid state memory, or any other electronic, magnetic, optical, or other memory device capable of storing program code.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

I claim:

1. A system for navigating posts in a discussion including parent posts and child posts, each of the child posts being in reply to a respective one of the parent posts, wherein a further reply can be made to any of the child posts and wherein multiple child posts can be made in reply to respective ones of the parent or child posts, the method comprising:
a server including:
a communications device configured to receive the posts; and
a message store configured to store the posts, the server being configured to provide to a client, using the communications device, access to:
a formatter configured to arrange the posts in the discussion linearly one below another in an arrangement including a parent post and a child post of the parent post, and to provide display frameworks around respective ones of the posts, the display frameworks varying depending at least upon parent-child relationship, there being at least three different types of frameworks;
a parent navigator which, when actuated, causes a copy of the parent post to be inserted adjacent its child post while retaining the parent post in the arrangement, wherein the parent post is included more than once in the arrangement; and;
a child navigator which, when actuated, causes the copy of the parent post to be inserted adjacent its child post.

2. A system in accordance with claim 1 wherein the parent navigator is selectively actuated by interacting with a graphic in one of the child posts.

3. A system in accordance with claim 1 where the server is further configured to provide, to the client, access to a sorter configured to sort posts in any of a number of user selectable manners, wherein the parent navigator, when actuated, causes the copy of the parent post to be inserted adjacent its child post without regard to the sort order.

4. A system in accordance with claim 1 wherein a parent navigator, when actuated, causes a copy of a parent post to be inserted immediately above its child post while retaining the parent post in the arrangement.

5. A system in accordance with claim 4 wherein the parent navigator causing the copy of the parent post to be inserted immediately above its child post causes the inserted copy of the parent post immediately above its child post to be visually differentiated from other posts.

6. A system in accordance with claim 1 wherein a child navigator, when actuated, causes a copy of a child post to be inserted immediately below its parent post without regard to a sort order.

7. A system in accordance with claim 6 wherein the child navigator causing the copy of the child post to be inserted immediately below its parent post causes the inserted copy of the child post immediately below its parent post to be visually differentiated from other posts.

8. A system in accordance with claim 1 and configured to change the type of display framework around a post when at least one of the child navigator and parent navigator is actuated.

9. A system in accordance with claim 1 wherein the parent posts includes a root post which is a parent to all the other posts in the discussion, wherein the child posts include siblings that have a common parent post, and wherein the display frameworks include a first type indicating that a post is a reply to a sibling, a second type indicating that a post is a reply to a post that is not a sibling, and third type indicating that a post is the root post.

10. A system in accordance with claim 1 wherein the parent posts includes a root post which is a parent to all the other posts in the discussion, wherein the child posts include siblings that have a common parent post, and wherein the display frameworks include a first type indicating that a post is a reply to a sibling, and a second type indicating that a post is a reply to the root post.

11. A system in accordance with claim 1 wherein the posts have respective authors, and wherein the server is further configured to provide to the client a sorter configured to selectively sort posts based on kudos of the authors as well as based on at least some of the following manners: newest to oldest, oldest to newest, most viewed, most replied to, and most voted.

12. A system in accordance with claim 1 and further comprising the client configured to selectively communicate with the server, using the communications device of the server, and a monitor coupled to the client.

13. A system in accordance with claim 1 wherein the posts have authors and can have tags, the system further comprising a filter configured to filter the posts by at least one of the tags and the authors.

14. A method for navigating posts in a discussion including parent posts and child posts, each of the child posts being in reply to respective one of the parent posts, wherein a further reply can be made to any of the child posts and wherein multiple child posts can be made in reply to respective ones of the parent or child posts, the method comprising:
receiving the posts and storing the posts;
arranging the posts in the discussion linearly one below another in a linear list in a first window in a display arrangement; and
providing a parent navigator which, when actuated, causes a copy of an original parent post to be inserted above or below its child post as a post of the linear list in the first window in the display arrangement, while also retaining the original parent post in the display arrangement.

15. A method in accordance with claim 14 and further comprising providing a child navigator which, when actuated, causes a copy of a parent post to be inserted adjacent its child post in the linear list in the first window in the display arrangement while also retaining the original parent post in the display arrangement.

16. A method in accordance with claim 14 wherein the parent navigator is selectively actuated by interacting with a graphic in one of the child posts.

17. A method in accordance with claim 16 and further comprising providing a sorter configured to sort the posts in any of a number of user selectable manners, wherein a parent navigator, when actuated, causes a copy of an original parent post to be inserted adjacent its child post without regard to a sort order while also including the original parent post from which the copy inserted adjacent its child post was made, in the linear list in the display arrangement.

18. A method in accordance with claim 17 wherein a parent navigator, when actuated, causes a copy of a parent post to be inserted immediately above its child post while retaining the parent post in the arrangement.

19. A method in accordance with claim 14 wherein the parent navigator causes the inserted copy of the original parent post to be visually differentiated from other types of posts to indicate that it is the copy of the original parent post.

20. A method in accordance with claim 19 and further comprising providing a child navigator which, when actuated, causes a copy of a parent post to be inserted immediately below its parent post without regard to the sort order.

21. A method in accordance with claim 14 wherein the parent posts includes a root post which is a parent to all the other posts in the discussion, wherein the child posts include siblings that have a common parent post, and further comprising providing at least three different types of display frameworks, including a first type indicating that a post is a reply to a sibling, a second type indicating that a post is a reply to a post that is not a sibling, and third type indicating that a post is the root post.

22. A method in accordance with claim 14 wherein the parent posts includes the root post which is a parent to all the other posts in the discussion, wherein the child posts include siblings that have a common parent post, and further comprising providing at least three different types of display frameworks, including a first type indicating that a post is a reply to a sibling, a second type indicating that a post is a reply to a post that is not a sibling, and third type indicating that a post is a reply to the root post.

23. A method for navigating posts in a discussion including parent posts and child posts, each of the child posts being in reply to a respective one of the parent posts, wherein a further reply can be made to any of the child posts and wherein multiple child posts can be made in reply to respective ones of the parent or child posts, the method comprising:
receiving the posts and storing the posts;
arranging the posts in the discussion linearly one below another in a display arrangement; and
providing a parent navigator which, when actuated, causes a copy of an original parent post to be inserted adjacent its child post in the display arrangement while also retaining the original parent post in the display arrangement, the parent navigator causing the inserted copy of the parent post to be visually differentiated from other types of posts to indicate that it is the copy of the parent post;
providing a child navigator which, when actuated, causes the copy of the parent post to be inserted immediately below its parent post without regard to the sort order;
providing different types of display frameworks around different types of posts depending on at least position within the display arrangement.

24. A method in accordance with claim 23 and further comprising changing the type of display framework around a post when at least one of the child navigator and parent navigator is actuated.

25. A computer readable medium bearing computer program code which, when executed by a server, causes the server to:
receive posts from discussions;
store the posts, including parent posts and child posts, each of the child posts being in reply to a respective one of the parent posts, wherein a further reply can be made to any of the child posts and wherein multiple child posts can be made in reply to a single parent post, at least one post including text; and provide to a client access to:
- a formatter configured to arrange the posts in a discussion linearly one below another in a window including an original parent post and a child post of the parent post; and
- a parent navigator which, when actuated, causes a copy of a parent post to be inserted adjacent its child post in the window, without using a pop-up, while also retaining the original parent post in the window.

26. A computer readable medium in accordance with claim 25 wherein the computer program code, when executed by the server, further causes the server to provide to the client access to a child navigator which, when actuated, causes the copy of the parent post to be inserted adjacent its child post in the window.

27. A system for navigating posts in a discussion including parent posts and child posts, each of the child posts being in reply to a respective one of the parent posts, wherein a further reply can be made to any of the child posts and wherein multiple child posts can be made in reply to respective ones of the parent or child posts, the posts having respective authors, the system comprising:
   a server including:
      a communications device configured to receive the posts; and
      a message store configured to store the posts, the server being configured to provide to a client, using the communications device, access to:
         a formatter configured to arrange the posts in the discussion linearly one below another in an arrangement including a parent post and a child post of the parent post, and to provide display frameworks around respective ones of the posts, the display frameworks varying depending at least upon parent-child relationship, there being at least three different types of frameworks;
         a parent navigator which, when actuated, causes a copy of the parent post to be inserted adjacent its child post while retaining the parent post in the arrangement, wherein the parent post is included more than once in the arrangement; and
         a sorter configured to selectively sort posts based on at least kudos of the authors, most voted, newest to oldest, oldest to newest, most viewed, and most replied to.

28. A system in accordance with claim 27 and further comprising a client configured to selectively communicate with the server, using the communications device of the server, and a monitor coupled to the client.

29. A system in accordance with claim 27 wherein the posts have authors and can have tags, the system further comprising a filter configured to filter the posts by at least one of the tags and the authors.

* * * * *